Nov. 30, 1965    G. GEIER ETAL    3,220,113
SURFACE CHECKING DEVICE
Filed July 17, 1961    7 Sheets-Sheet 1

INVENTORS
GEORGE GEIER
BY CHARLES R. ELLIS
ALLISTER L. BAKER

ATTORNEY

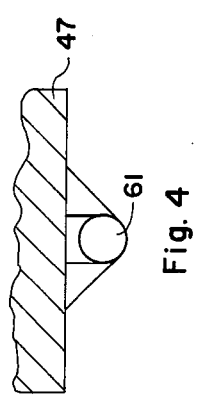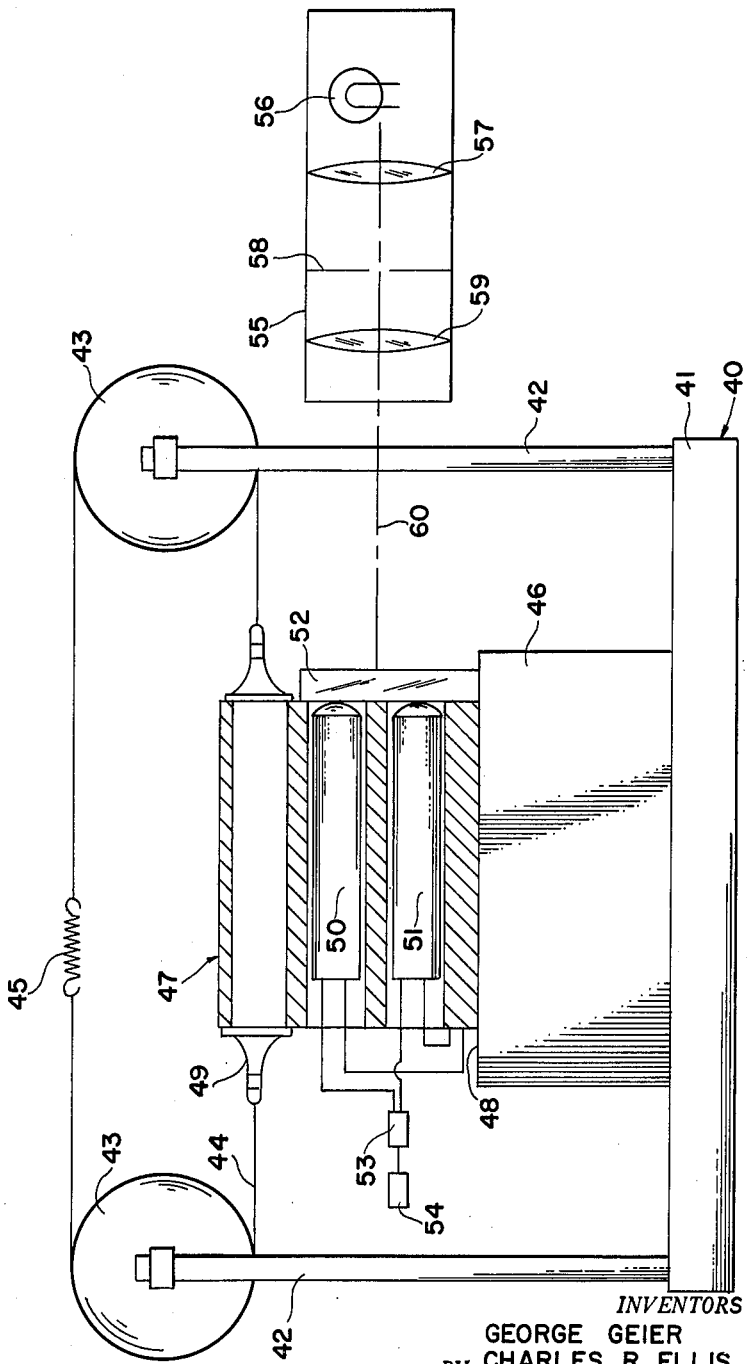

INVENTORS
GEORGE GEIER
CHARLES R. ELLIS
ALLISTER L. BAKER
BY
J. Russell Juten
ATTORNEY Nov. 30, 1965 G. GEIER ETAL 3,220,113
SURFACE CHECKING DEVICE
Filed July 17, 1961 7 Sheets-Sheet 5

INVENTORS
GEORGE GEIER
BY CHARLES R. ELLIS
ALLISTER L. BAKER

ATTORNEY

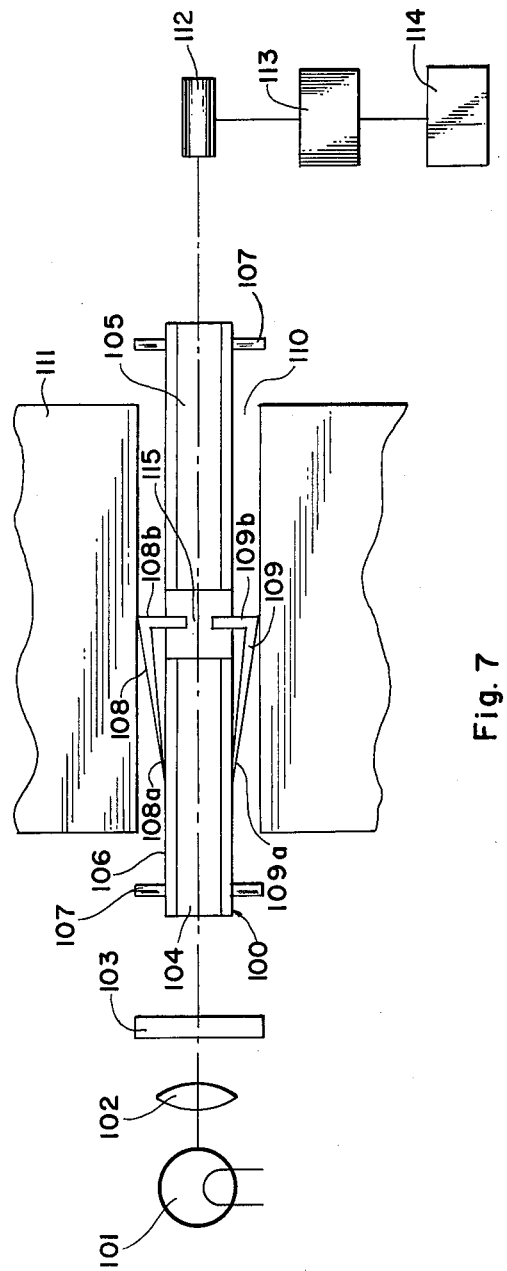

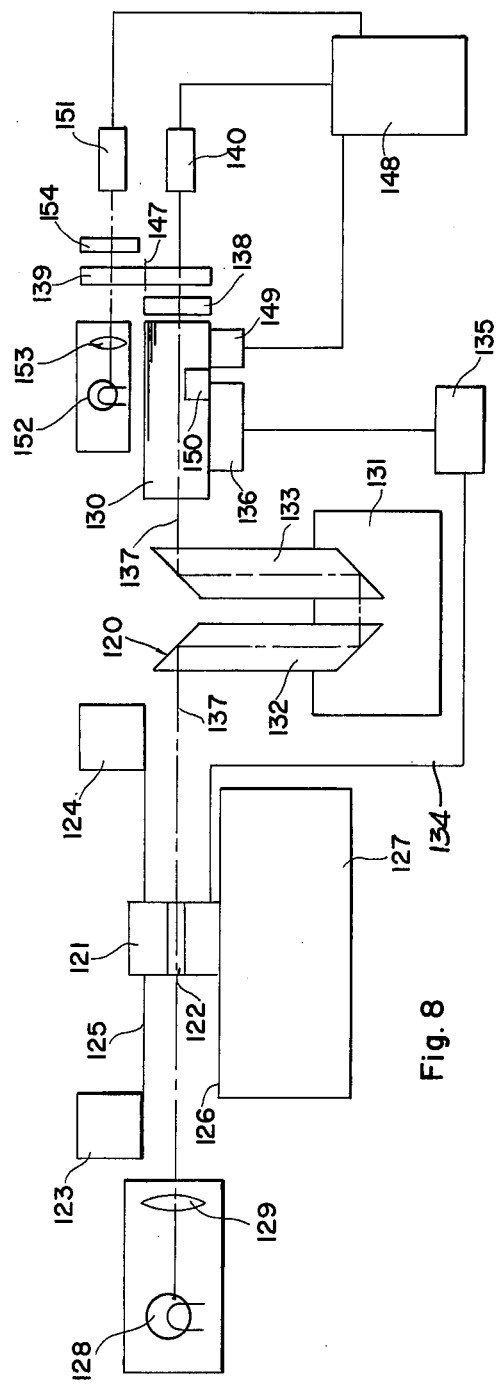
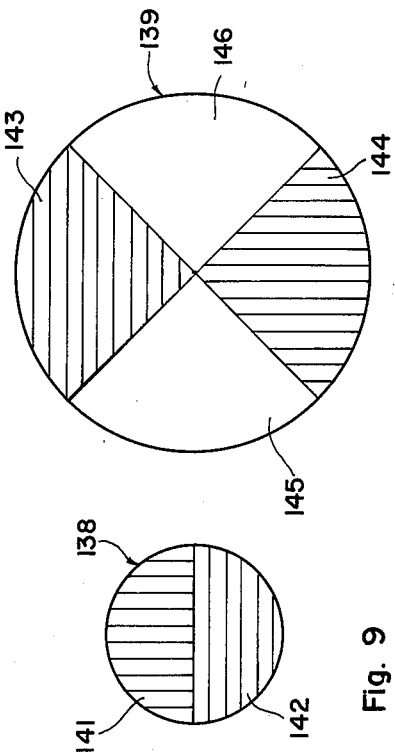

3,220,113
SURFACE CHECKING DEVICE

George Geier, Teaneck, Charles R. Ellis, Andover, and Allister L. Baker, Denville, N.J., assignors to Keuffel & Esser Company, Hoboken, N.J., a corporation of New Jersey
Filed July 17, 1961, Ser. No. 124,511
9 Claims. (Cl. 33—169)

This invention relates to surface and cavity checking devices, and refers more particularly to means for measuring and recording variations in one or more surfaces or cavities.

In prior art there have been some attempts to check variations of surfaces particularly as respects the curvature of gun barrels. Some of the prior art attempts included running a mirror through a gun barrel and reflecting auto-collimated light off the mirror to determine barrel curvature or variation. In general however the prior art devices have not achieved the accuracy required to check surface variations in modern high precision industries and other fields.

An object of the present invention is to provide a surface checking device not having the disadvantages of prior art.

Another object is to provide a surface checking device for measuring and recording the variation in one or more surfaces to a high degree of precision.

Another object is to provide a checking device for checking and recording the variations in a slot or other type of cavity.

Another object is to provide an electro-optical device for determining and recording the variations in one or more surfaces and cavities.

Other objects of the present invention will become apparent in the course of the following specification.

The objects of the present invention may be realized through the provision of a surface checking device or cavity checking device having electro-optical means for checking and recording the variations in one or more surfaces or cavities. The electro-optical means comprise contacting means for contacting the one or more surfaces to be checked, the contacting means being disposed in a path of light between the light source and a photosensitive electro-means such as photocell means. As the contacting means encounters variations in the surface or surfaces which it contacts, it undergoes movement or change of shape which are a function of the surface variation. This movement or change of shape of the contact means results, either directly or through intermediate means, in deviation in the path of the light falling on the photocell means or in a change in the intensity of light falling on the photocell means, either of which are then functions of the surface variations. Electronic amplifying and indicating means connected to the photocell means make available the data as to the surface or cavity variations, whereby the surface or cavity variations are determined.

The present invention may be used to determine variations either on external or internal surfaces, and to determine changes in dimensions of slots, cavities and the like.

The invention will appear more clearly from the following detailed description when taken in connection with the accompanying drawings showing, by way of example, preferred embodiments of the inventive idea.

In the drawing:

FIGURE 3 is a side view partly schematic and partly in section of another embodiment of the present invention;

FIGURE 4 shows a sphere-type prober connected to the embodiment of FIGURE 3;

FIGURE 7 is a schematic of another embodiment of the present invention for determining slot or cavity width;

FIGURE 8 is a schematic of another embodiment of the present invention for determining surface deviations and slot widths and the like;

FIGURE 9 shows a polarized reticle of the embodiment of FIGURE 8; and

FIGURE 10 shows a rotatable polarized analyzer of the embodiment of FIGURE 8.

Figure 1:
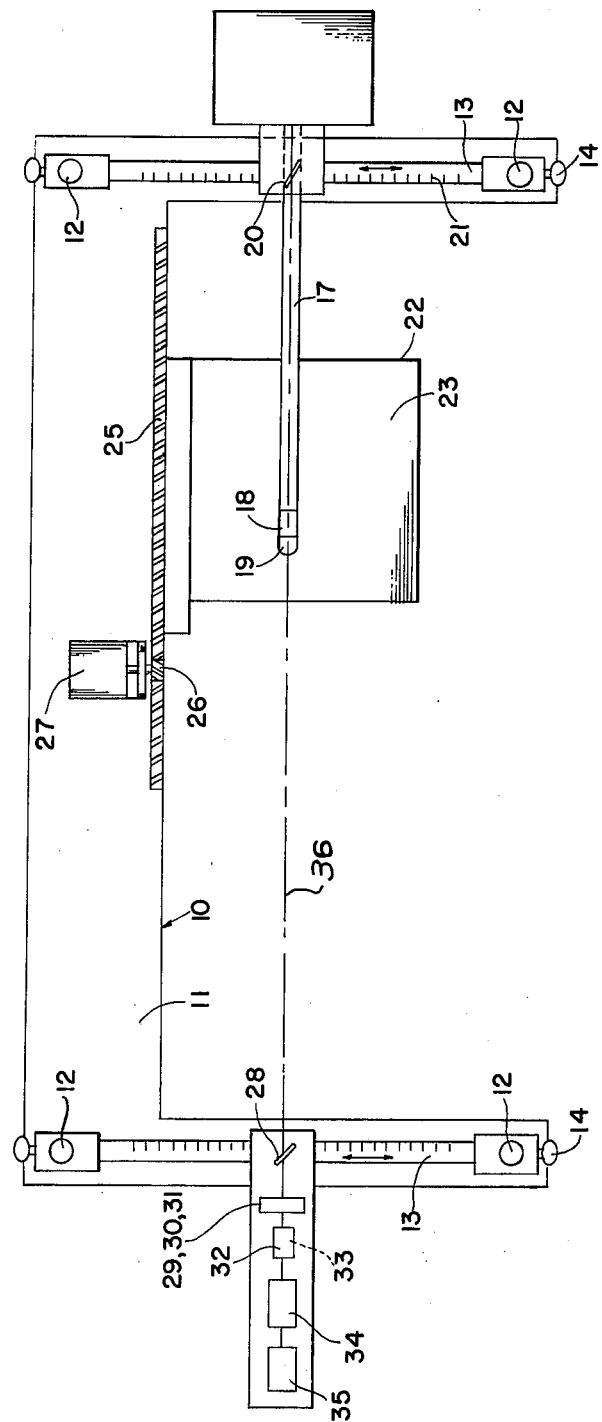
FIGURE 1 is a plan view partly schematic of a surface checking device of the present invention.
Figure 2:
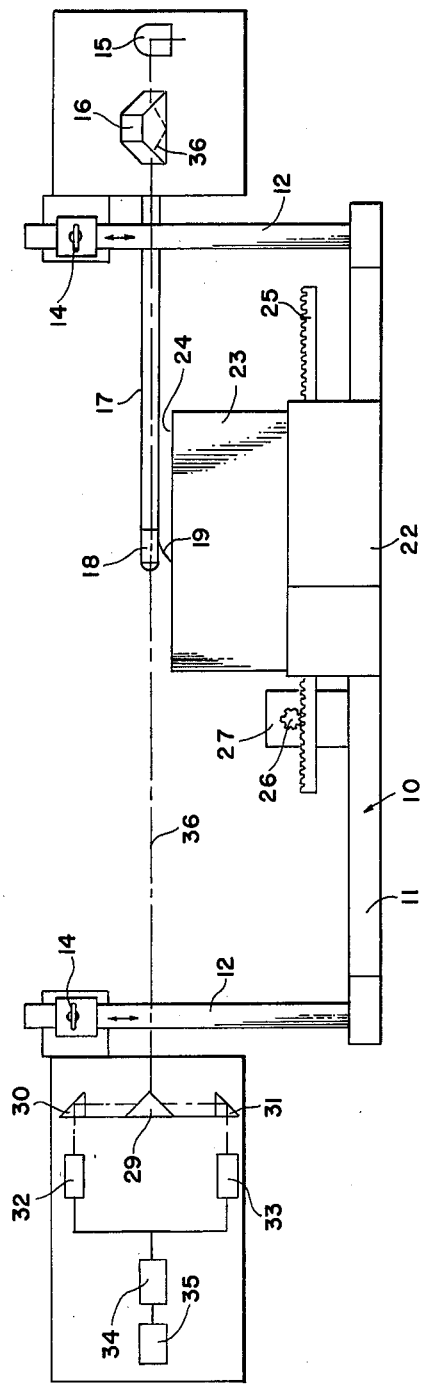
FIGURE 2 is a side view partly schematic of the device of FIGURE 1.

An embodiment of the present invention is shown in FIGURES 1 and 2 and comprises a frame 11, four upright members 12 connected to frame 11, and two horizontally disposed bars 13 which are movable vertically on members 12 and which can be fixed at any height by means of thumb screw 14 or the like. A light source 15 comprising a single ribbon filament incandescent lamp, a dove prism 16 or other means for rotating the image of the filament of light source 15 through 90° and a spring loaded probe tube 17 having a converging lens 18, a sensing finger 19 at one end are connected to a bar 13 so as to be movable along bar 13 or fixed in any selected position by thumb screw 20 at a point indicated by graduations 21. These members are so disposed with respect to one another that the image of the vertical filament of light source 15 passed through dove prism 16 is rotated 90° into a horizontal position and passes through probe tube 17 and through converging lens 18. The sensing finger 19 is preferably of a highly polished metal so that the work surface with variations sought to be checked will not be scratched.

A work piece support or gage block 22 supports work piece 23 whose surface 24 in this case is to be checked for variations. Rack 25 and pinion 26 move the work piece horizontally so that the sensing finger 19 is in contact with the surface 24 along a selected line. Pinion 26 is connected to potentiometer 27 so that it is possible to determine at any given instant the relative location of a sensing finger 19 with respect to the work piece 23 and its surface 24 the potentiometer 27 may be connected directly to a readout and recording means for correlating the surface variations determined with the dimensions of the work piece 23. Connected to the second horizontal bar 13 and movable horizontally thereon, and being able to be fixed selectively thereon by means of thumb screw 28 is a silvered prism 29 and prisms 30 and 31 disposed above and below prism 29 and photocells 32 and 33 (photomultipliers may be used where desired). The photocells 32 and 33 are electrically connected in the form of a bridge, such as a Wheatstone bridge, to amplifier 34 which in turn is connected to an indicator, meter, and recorder 35 or the like.

The manner and use of operation of the embodiment 10 of the present invention is as follows:

The problem which the present invention seeks to solve is the measuring and recording of the contour of a surface, either external or internal, to a very high degree of accuracy.

The embodiment 10, for example, measures surface contour by converting surface contour displacement into displacement of a light beam and measuring the displacement of the light beam by photoelectric means. The light source 15 is a single ribbon filament incandescent lamp which must be operated with the filament in a vertical position in order to prevent the filament from distorting when lit. If the filament is held at a horizontal angle for example, its own weight will cause distortions during heat up. A beam of light 36 is emitted from light source 15 as a vertical beam of light and passes through dove prism 16 which is disposed at an angle of 45° with respect to the vertical filament whereby the dove prism 16 rotates the image of the filament through an angle of 90° thus producing a horizontal image.

It should be noted that the single ribbon filament light source 15 and dove prism 16 may be replaced by another light source behind an optical slit.

After the horizontal light beam 36 leaves dove prism 16 it passes through probe tube 17 which is rigidly connected to the means supporting the light source 15 and dove prism 16 so that all three members move together. The probe tube 17 is spring loaded against the surface 24 and work piece 23 whereby as the rack 25 and pinion 26 move the work piece 23 the sensing finger 19 follows the contour of surface 24 thus causing the sensing end of probe tube 17 and converging lens 18 to be moved vertically and proportionally to the surface variations encountered in surface 24. Therefore, the beam of light 36 will pass through different portions of converging lens 18 depending upon the variations in surface 24. The converging lens 18 focuses the horizontal image of the lamp filament of light source 15 on the edge of the silvered prism 29. This edge divides the image into two parts, i.e., that part which is above the edge and that part which is below the edge. These two parts of the image are directed by two other prisms 30, 31 to illuminate photocells 32, 33. These two photocells are connected as two legs of a Wheatstone bridge, or any other suitable bridge configuration, and the output of this bridge is proportional to the difference in the amount of light which falls upon the two photocells 32, 33. This output signal is amplified in amplifier 34 and is indicated and recorded on the indicator device, meter device, or recorder 35.

As the work piece 23 is moved beneath the sensing finger 19 the vertical deviation in the surface 24 of the work piece 23 cause sensing end of the probe tube 17 to move through the same vertical deviations and thus the converging lens 18 follows the deviations in the surface 24. As this lens 18 moves it causes the image of the light source filament to move across the edge of the silvered prism 29 which in turn varies the ratio of illumination on the upper and lower photocells 32 and 33. This provides the output from the bridge which is proportional to the vertical displacement of the surface 24, and this image output is then amplified and indicated on a meter or recorder.

The location of the sensing finger 19 along the length of the work piece 23 is measured by a potentiometer 27 which is geared to work piece 23 by a rack 25 and pinion 26 as shown. This potentiometer 27 provides abscissa information. When the output of the photocell bridge is plotted on one axis (Y-axis) and the output of the potentiometer 27 is plotted on the other axis (X-axis) on an X–Y recorder, the surface contour of the work piece will be drawn to scale. Thus the curve is achieved which is a scale representation of the surface contour along the line on which the sensing finger 19 moves across the surface 24.

Since the light source 15 and probe tube assembly 17 on the one hand and prism and photocell assembly on the other hand may be moved vertically and horizontally any work piece can be accommodated and the probe sensing finger 19 can be moved across the work piece along a series of parallel lines and if the zero of the plotting device is shifted accordingly then a family of curves will be drawn which will be a scale representation of the surface 24 as seen isometrically. The angle of viewing may be adjusted by controlling the zero adjustment between the passes of the probe.

Gage blocks are available with non-surface deviations for testing the device.

The rate at which the work piece 23 can be moved passed sensing finger 19 is governed by the response to changes in light of the photocells and therefore if photomultipliers are used a faster work rate may be achieved.

Of course, a plurality of probe assemblies and prism and photocell assemblies may be mounted in alignment on bars 13 thereby simultaneously determining the surface variations along a series of parallel lines. If desired, it is also possible to move the probe device and photocell device along the bars 13 while the work piece is moving in contact with sensing finger 19 thereby determining variations along a diagonal line on surface 24.

The output signals (X and Y) are direct analogs of the surface 24. With the introduction of an object analog cross feed, a three dimensional scale representation is obtained. Such scale drawings can be plotted either orthographically or isometrically. These drawings could be plotted in Cartesian, polar, or cylindrical coordinate.

This technique can also be used differentially with the present invention to show the difference between the lines, surfaces, or filaments and would yield direct readings of deviations from a standard unit. This type of measurement is extremely useful for checking nonlinear surfaces against a reference.

The output of the present invention may be digitalized in any or all planes, and printed outputs of surface contours can be produced. Such outputs can show either absolute or different dimensions, that has physical measurements or deviations or a desired dimension or surface. The output can also be used to contour images which generate or correct specific pieces.

Of course, photocells 32 and 33 may be replaced by a single photocell if suitable optical means are supplied to have both light beams pass through a light chopper device so as to alternately fall upon the single photocell, thereby giving a readout in the indicator means of the surface variations. Special photocells are available not requiring dividing edges.

Another embodiment 40 of the present invention is shown in FIGURE 3 and comprises a mounting base or frame 41, and vertical mounting rods 42 rigidly connected to mounting base 41 and supporting pulleys 43, and a wire 44 passing over both pulleys 43 and having a low tension spring 45 therein. A workpiece 46 is shown being engaged by the probe or sensing unit 47 which rests on the workpiece surface 48 whose variations are to be determined.

The probe or sensing unit 47 comprises a swivel guide rod 49 to which at each end is attached wire 44 for moving the entire probe or sensing device 47 over the surface 48 of workpiece 46. The sensing unit 47 also comprises two photo-cells 50 and 51 which are disposed in openings in the sensing unit 47. A diffusing surface 52 such as milk-glass is mounted perpendicular to the photo-cell axes. The diffusing point on the milk-glass 52 is equally spaced between the heads of the photo-cells 50–51.

Both photo-cells 50–51 have one lead sodded to the probe 47 and the other connected to an amplifier 53 which is a conventional D.C. vacuum tube amplifier, the amplifier 53 in turn being connected to an indicator, meter, or recorder 54.

A self-focusing telescope 55 which contains a light source 56, a condenser lens 57, a slit target 58 and objective lens 59 is disposed in alignment with the diffusing surface 52.

The embodiment 40 of the present invention is an optical probe equipped with a self-focusing telescope and is used to measure, by photoelectric means, the level variations of a surface with respect to a fixed beam of light. The manner of operation and use of embodiment 40 of the present invention is as follows:

The probe 47 slides on the surface 48 to be measured by means of wire 44 and pulleys 43 together with any motive force which is convenient. Since the surface of the probe 47 coming in contact with surface 48 is a flat surface and not a point surface, this particular embodiment as shown would measure level variations over a particular distance rather than minute surface variations at each particular point. The swivel guide 49 permits the probe 47 to be pulled across surface 48 while still allowing the probe 47 to follow the contour of the surface 48.

Light from light source 56 in self-focusing telescope 55 passes through the converging lens 57, through the optical slit 58 and through the objective lens 49 and this beam of light 60 which has illuminated the slit target 58 after leaving light source 56 and passing through condenser lens 57, projects the slit target through the objective lens 59 and on to the diffusing surface or milkglass 52. Since the diffusing point on the diffusing surface or milk-glass 52 is equally spaced between the heads of the photo-cells 50–51, the beam of light 60 is divided into two beams of equal light intensity and these two beams are picked up by the two photo-cells. However, since the probe 47 slides on surface 48, which has irregularities, a change in the level of the surface 48 with respect to the optical axis of the self-focusing telescope 55, thus will increase light intensity on the one photo-cell and decrease it on the other depending on whether the light beam falls on the diffusing surface 52 closer to one or the other of the photo-cells. The signals generated by the two photo-cells 50, 51 are compared in the amplifier 53 and the difference signal is transmitted to the indicator 54 for display. It has been found that photo-cells of diameter .080″ will serve this purpose well and such photo-cells or the like are commercially available.

The probe 47 is connected to the amplifier ground by means of the swivel guide rod 49, and the galvanized wire 44, pulleys 43, and mounting rods 42.

The amplifier 53 can be a transistorized differential amplifier, and the indicator can be a micro-ammeter or the like. The indicator 54 may be calibrated by measuring a surface of known variation.

If it is desired to measure point variations on surface 48 with the embodiment 40 of the present invention, a spherical member 61 may be attached to the lower surface of probe 47 as shown in FIGURE 4. The operation of the embodiment of FIGURE 4 is then the same as that of FIGURE 3.

Figure 5:
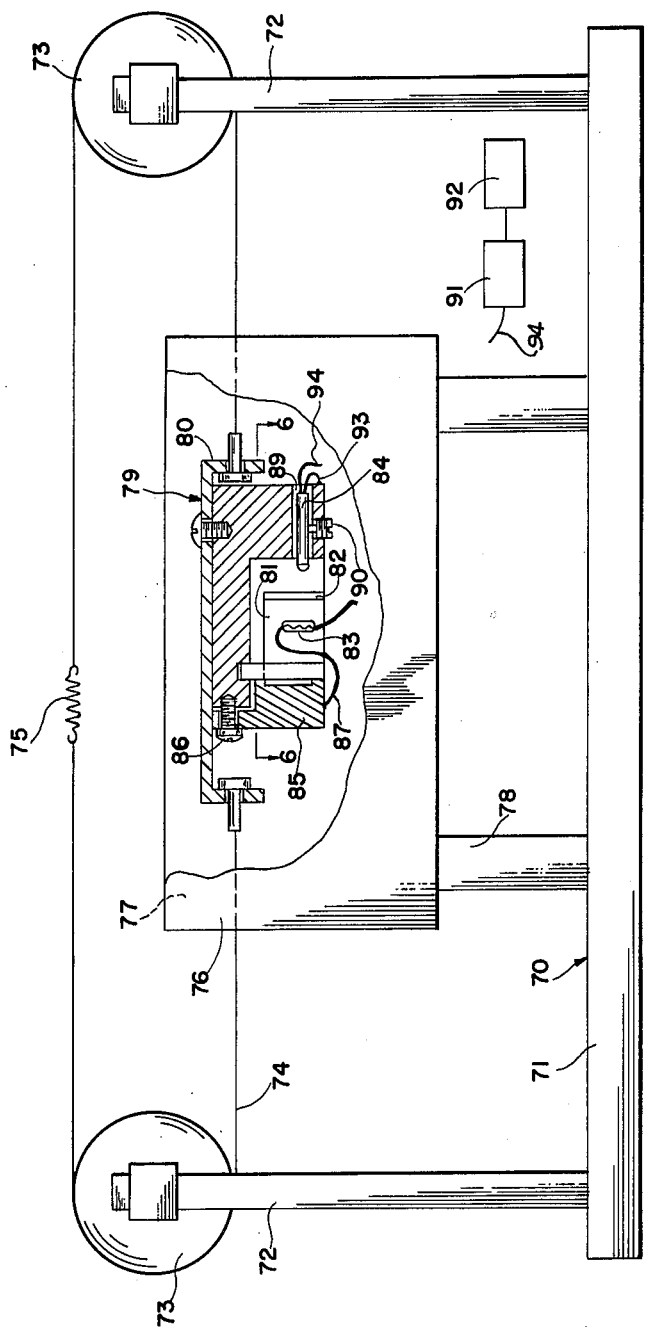
FIGURE 5 is a side view partly in section and partly schematic of another embodiment of the present invention useful for determining variations in slot or cavity dimensions.
Figure 6:
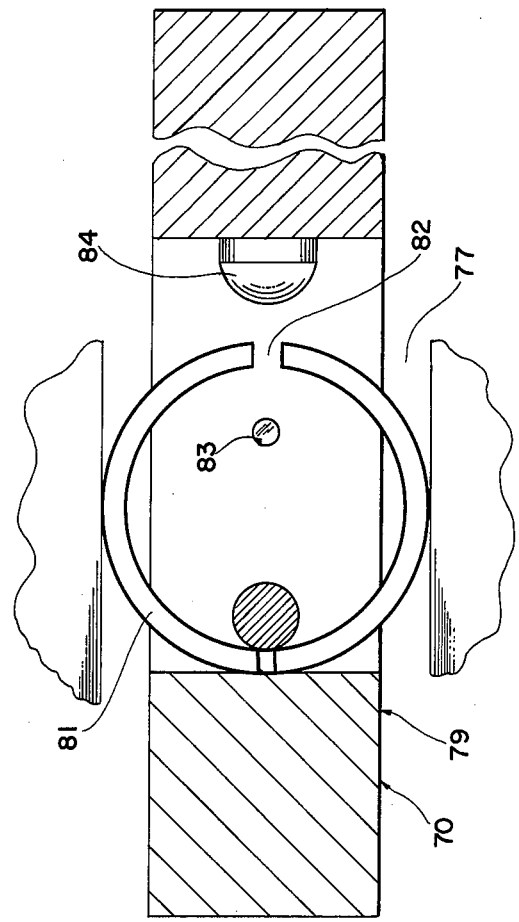
FIGURE 6 is a sectional view along line 6—6 of FIGURE 5.

An embodiment of the present invention is shown in FIGURES 5 and 6 and comprises a mounting base or frame 71, mounting rods 72 rigidly connected to mounting base 71 and supporting pulleys 73 and a wire 74 running over pulleys 73 and having a low tension spring 75 therein. A workpiece 76 having a slot 77 running therethrough is supported on a gauge block 78.

The probe sensing unit 79 comprises a probe mounting swivel assembly 80 which is connected at each end to wire 74 as shown.

The probe sensing unit 79 also comprises a cylinder or ring 81 having a longitudinal slot or opening 82 passing entirely therethrough and a light source 83 disposed within the cylinder 81 in the vicinity of and preferably in alignment with opening 82, and a photo-cell 84 disposed in a probe sensing unit 79 outside of cylinder 81 but preferably in the vicinity of and in alignment with opening 82. The cylinder 81 is connected to the probe body by means of arm 85 and set screw 86.

The light source 83, which may be a Pinlite bulb is held inside the cylinder 81 by means of a set screw, and a grounded lead 87. The grounded body of the probe is the common return for both the battery 88 (which may be a three-volt battery or the like) supplying current to the bulb or light source 83 and the positive lead of the photo-cell 84.

The photo-cell 84 is disposed in a hole 89 drilled lengthwise in the probe body and the photo-cell may be adjusted by means of the said screw 90. As may be seen in FIGURES 5 and 6, the photo-cell head 84 is close to the outside of the cylinder opening or slot 82 while the light source or bulb 83 is close to the inside of the slot 82 whereby the light source 83 and photo-cell 84 are in alignment. The photo-cell is connected across the output of a voltage power supply (not shown) with its negative lead to the control grid of the voltage amplifier tube and amplifier 91. The amplifier in turn is connected to an indicator, meter, or recorder 92 for readout of slot variation.

As was previously noted, a positive lead 93 is sodded to the probe body while a negative lead 94 is connected to the grid control of the amplifier tube.

The amplifier 91 is a conventional D.C. vacuum tube amplifier.

The indicator may be a moving coil micro-ammeter which may be calibrated by known means.

The embodiment 70 of the present invention is a photosensitive probe equipped with an internal light source and is used to measure variations in slot sizes.

The manner of use and operation of embodiment 70 of the present invention is somewhat as follows:

The probe sensing unit 79 is placed in the slot whose variations in slot size is to be determined. The slotted cylinder 81 is made of an elastic metal or alloy and because of the slot 82 cut into it lengthwise, an external pressure across the diameter of the cylinder 81 closes the opening or slot 82 proportionately until it is fully closed. Therefore, when the probe sensing unit 79 is placed in a slot 77, a cylinder 81 of suitable width so as to be engaged by the walls of slot 77 must be utilized. Therefore, as the slot narrows, the pressure across the diameter of cylinder 81 increases and slot 82 in the cylinder 81 also decreases, decreasing the amount of light from bulb 83 which can pass through the slot 82 toward the photo-cell 84. As the external pressure of the walls of slot 77 decreases because of slot 77 becoming wider, the cylinder 81 returns to its original diameter, i.e. it may increase in diameter up to its original diameter, and the slot opening 82 becomes wider, thus increasing the amount of light from light source 83 which is directed toward photo-cell 84.

By using a motive force to turn pulleys 73 and to move wire 74, the probe sensing unit 79 may be drawn through the slot 77 whereby the cylinder 81 comes in contact with the slot 77 along its entire length and the walls of slot 77 apply greater or lesser pressure on cylinder 81 depending on the width of slot 77. The diameter of cylinder 81 changes in accordance with the dimensions of the slot 77. Since variations in the size of slot 77 cause variations in the cylinder slot 82 and thereby vary the amount of light going through the photo-cell 84, these light variations vary the photo-cell resistance and the bias of the amplifier tube. This information is then read out in indicator 92 giving the variation in width of slot 77.

The cylinder 81 is the measuring device and its diameter determines the minimum and maximum measurable slot size. It has been found that good results can be achieved where the cylinder opening 82 is equal to 40% of the cylinder diameter and where the maximum width to be measured is 90% of the cylinder diameter and the minimum width is 85% of the cylinder diameter. The cylinder diameter is determined by the probe thickness and the latter is determined by the photo-cell diameter. Very small photo-cells are commercially available.

The correct photo-cell polarity must be observed.

The embodiment 70 of the present invention is easily utilized in various kinds of slots or cavities whether they be internal or external.

An embodiment 100 of the present invention is shown in FIGURE 7 and comprises a light source 101, a condenser 102, diffusing means 103, and Lucite rods 104 and 105, which are held in alignment by metal sleeve 106. The Lucite rods 104 and 105 are fixed by means of brackets 107. Two "L" shaped elastic metal spring like members 108 and 109, which may be made of Phosphor bronze or the like are securely connected to the sleeve 106 at their ends 108a and 109a. The inwardly extending portions 108b and 109b of members 108 and 109 are disposed in the opening between the Lucite rods 104 and 105. The sleeve 106 is slotted so as to permit portions 108b and 109b to extend there through. When the members 108 and 109 are placed in a slot 110 of a work piece 111 they contact the slot walls as shown.

A photo-cell 112 is disposed in alignment with the Lucite rods 104 and 105 at the opposite end from light source 101. Photo-cell 112 is connected to amplifier 113 which in turn is connected to the indicator, meter, or recorder 114.

The embodiment 100 of the present invention is particularly useful for determining the variations in width of slots or other cavities, and the manner of use and operation is somewhat as follows:

With the Lucite rods 104 and 105 and metal sleeve 106 fixed in place by brackets 107 a work piece 111 is so located that the Lucite rods and spring members 108 and 109 are disposed within slot 110. The members 108 and 109 contact the slot walls and in order to determine wall variation the work piece is moved longitudinally with respect to members 108 and 109 so that these members contact contiguous portions of the slot walls in succession. If the slot width decreases the walls apply an increased pressure on members 108 and 109 forcing them toward one another and thereby decreasing the size of opening 115. If the slot width increases the pressure on members 108 and 109 decreases and consequently they move away from one another and opening 115 increases in size.

Light from light source 101 passes through the Lucite rod 104 (other similar light transmitting materials may also be used), and then through opening 115 and through Lucite rod 105 and hits photo-cell 112. The amount of light passing through opening 115 is dependent upon the width of the opening, which as explained above, depends upon the pressure extended upon members 108 and 109 between slot walls of work piece 111. Therefore the light falling upon photo-cell 112 through opening 115 is a function of the variation in width of slot 110. The light falling on photo-cell 112 creates impulses which are sent to amplifier 113 and which are then available as readout data in indicator 114.

If desired the work piece may be held stationary and the Lucite rod assembly moved through the slot.

An embodiment 120 of the present invention is shown in FIGURES 8, 9, and 10 and comprises light variation contact means such as gage means 121 having an aperture 122, and a cable feed mechanism 123 and a cable tensioning device 124 which are connected to gage means 121 by means of cable 125. As shown in FIGURE 8 a gage means 121 is in contact with surface 126 of work piece 127, however it might be equally used in a slot or other cavity. The cable feed mechanism 123 and cable tensioning device 124 and cable 125 enable gage means 121 to be drawn across surface 126. A light source 128 and condenser lense 129 are disposed substantially in alignment with aperture 122. An optical tooling telescope 130 is disposed on the opposite side of aperture 122 of gage means 121 from light source 128. Romboidal positioned means 131 comprises Romboid prisms 132 and 133 and means for rotating these prisms normal to the plane of the drawing for the purposes of allowing the optical tooling telescope 130 to receive the light rays passing through aperture 122 from a plurality of positions of gage means 121.

Gage means 121 is connected by means 134 to potentiometer 135 which in turn is connected to a servomechanism which controls the focusing of telescope 130, whereby telescope 130, is automatically focused on aperture 122 as gage means 121 is moved. The light beam 137 from light source 128 after passing through Romboid prisms 132 and 133 and through the optical system of the automatically refocusing telescope 130 passes through a first polarizer reticle 138 and then through a rotatable second polarizer 139 and then hits photo cell 140.

The first polarizer reticle 138 is shown in FIGURE 9 wherein the upper portion 141 is polarized in a vertical direction while the bottom half 142 is polarized in a horizontal direction. Consequently only vertical polarized light may pass through the upper portion 141 while only horizontally polarized light may pass through the lower portion 142.

Rotatable second polarizer 139 is shown in FIGURE 10 and is divided into 4 portions. Portion 143 is polarized in a substantially tangential direction while portion 144 is polarized at right angles to portion 143, while portions 145 and 146 are opaque and transmit no light. The second polarizer 139 rotates about axis 147 which is shown disposed so that the lower half of the second polarizer 139 covers the first polarizer reticle 138. Therefore when portion 143 is in alignment with polarizer reticle 138 only the horizontally polarized light passing through portion 142 can pass through portion 143 and consequently only that portion of the image of aperture 122 which is below the mid point of polarizer reticle 138 and which passes through portion 142 falls on photo cell 140. When the polarizer 139 is so disposed that the portion 144 covers polarizer 138 only that portion of the light image passing through portion 141 can pass through the portion 144 and consequently only that portion of the image passing through portion 141 falls on photo cell 140. When either opaque portions 145, 146 cover polarizer 138 no light falls upon photo cell 140. The photo cell 140 is connected to amplifier 148 which in turn is connected to servo-mechanism 149 which controls the vertical movement of telescope 130.

In general as the gage means 121 moves across surface 126 the aperture 122 are moved in a vertical direction proportional to the surface irregularities and consequently the image of aperture 122 on polarizer reticle 138 will be above or below the center line. As the image is centered on reticle 138 the light falling on photo cell 140 will give curve portions of constant amplitude separated by zero amplitude portions. If the image is off-center the light falling on the photo cell 140 varies and gives variation impulses to amplifier 148. The amplifier controls servomechanism 149 which constantly tries to bring the image back into centered position on reticle 138, and a potentiometer 150 indicates the vertical movement of telescope 130 necessary to keep the image centered. This value may be easily recorded and gives an indication of the variations in the surface 126. At the same time potentiometer 135 and servo-mechanism 136 also can be used to indicate the location of the aperture 122 on surface 126 at any given time.

In order to determine at any given time whether the light falling upon telescope 140 is that passing through upper portion 141 or lower portion 142 of reticle 138 a reference photo cell 151 is used. This information is necessary in order to determine whether the impulses of photo cell 140 to amplifier 148 are indicative of downward or upward image correction. A light source 152, condenser lens 153 are so disposed that the light passes through an upper portion of polarizer 139 as the latter rotates and then passes a third polarizer 154 and hits photo cell 151. Photo cell 151 is connected to amplifier 148 which compares the signals from photo cell 140 and 151 whereby since the third polarizer 154 is polarized in only one direction for example horizontally in which case only horizontally polarized light will hit photo cell 151 and this can occur only when the horizontally polarized portion of polarizer 139 is aligned with polarizer 154. Therefore the signals of photo cell 151 to amplifier 148 are determinative of the instantaneous orientation of polarizer 139 which then enables the amplifier to determine whether the pulse from photo cell 140 results from an image passing through portion 141 or portion 142 of reticle 138.

Among the advantages of the present invention are that it is much more convenient, much more accurate, and easier and faster to use than any prior art device.

Light variation contact means comprises means for contacting an object or surface to be measured and for causing variation in light as a function of the variations of said object or surface including such as varying the path of the light or the configuration or intensity of the light beam.

It is apparent that the described examples are capable of many variations and modifications within the scope of the present invention. All such variations and modifications are to be included within the scope of the present invention.

What is claimed:

1. Measuring means, comprising contacting means for contacting a surface to be checked and having an aperture therein disposed in the path of a beam of light, movement of said contacting means with said aperture normal to said surface being a function of the variations of said surface, optical means for receiving said light passing through said aperture and transmitting said image thereof which varies in location normal to said surface as a function of the variation in said surface, polarizing means having two portions polarized normal to one another and receiving said image, rotatable polarizing means having two portions polarized normal to one another and the remainder being opaque, said rotatable polarizing means being disposed sequentially in partial optical alignment with said first polarizing means, whereby said rotatable polarizing means rotates in order for image light to pass both said first and second polarizing means which requires said two polarizing means portions which are in alignment to be polarized in the same direction, photoelectric means disposed in alignment with both of said first and second polarizing means for receiving light passing through both, light sequentially falling on said photoelectric means being light alternately passing through the two portions of said first polarizing means, whereby since the position of said aperture image is a function of said surface variation the difference in intensity of light passing through the differently polarized portions of said first polarizing means and falling on said photoelectric means is a function of the variation in said surface.

2. A checking device in accordance with claim 1, comprising servo-mechanism means connected to said photoelectric means and said telescope for moving said telescope so as to tend to attain an image evenly disposed between the two polarized portions of the first polarizer means, and a potentiometer connected to said telescope for determining the amount said telescope is moved to achieve the above position, said movement being a function of surface deviation, whereby the deviation of said surface is determined.

3. A checking device in accordance with claim 1, comprising a potentiometer connected to said contacting means for automatically determining the position of said contact means on said surface.

4. A checking device in accordance with claim 1, comprising a third polarizer polarized in one direction and disposed in the path of a beam of light first passing through said rotatable polarizer, and a third photoelectric means disposed in alignment with said third polarizer for receiving the beams of light passing through said third polarizer, whereby the orientation of said rotatable polarized at any given time may be determined.

5. Measuring means, comprising light variation contact means disposed in the path of a beam of light for contacting a surface to be checked, movement of said light variation contact means normal to said surface being a function of the variations of said surface, whereby said light is varied as a function of said surface, polarizing means and rotatable polarizing means each disposed in the path of said light after said light impinges upon said light variation contact means and each comprising polarized portions which are differently polarized, whereby portions of said light pass through both said polarizing means and said rotatable polarizing means when similarly polarized portions of each are in optical alignment, and photoelectric means disposed for receiving light which has passed through both said polarizing means and said rotatable polarizing means, whereby surface variation causes a difference in light falling upon said photoelectric means as a function of surface variation.

6. Measuring means, comprising light variation contact means disposed in the path of a beam of light for contacting a surface to be checked, movement of said light variation contact means normal to said surface being a function of the variations of said surface, whereby said light is varied as a function of said surface, polarizing means disposed in the path of said light after said light impinges upon said light variation contact means and comprising two differently polarized portions, rotatable polarizing means comprising two differently polarized portions and the remainder being opaque, said rotatable polarizing means and said polarizing means being disposed in partial optical alignment with one another, whereby rotation of said rotatable polarizing means allows light to pass through both said polarizing means and said rotatable polarizing means when similarly polarized portions are in alignment, and photoelectric means disposed in alignment with both of said polarizing means for receiving light passing through both, whereby the variation of light impinging upon said photoelectric means is a function of said surface variations.

7. Measuring means, comprising contacting means for contacting a surface to be checked and having an aperture therein disposed in the path of a beam of light, movement of said contacting means with said aperture normal to said surface being a function of the variations of said surface, optical means for receiving said light passing through said aperture and transmitting said image thereof which varies in location normal to said surface as a function of the variation in said surface, polarizing means having two portions polarized normal to one another and receiving said image, rotatable polarizing means being disposed sequentially in alignment with said first polarizing means, photoelectric means disposed in alignment with both of said first and second polarizing means for receiving light passing through both, whereby since the position of said aperture image is a function of said surface variation the light falling on said photoelectric means is a function of the variation in said surface.

8. Measuring means, comprising light variation contact means disposed in the path of a beam of light for contacting a surface to be checked, movement of said light variation contact means normal to said surface being a function of the variations of said surface, whereby said light is varied as a function of said surface, first polarizing means and rotatable polarizing means each disposed in the path of said light after said light impinges upon said light variation contact means, said first polarizing means comprising polarized portions which are differently polarized, whereby portions of said light pass through both said first polarizing means and said rotatable polarizing means when similarly polarized portions of each are in optical alignment, and photoelectric means disposed for receiving light which has passed through both said first polarizing means and said rotatable polarizing means, where surface variation causes a difference in light falling upon said photoelectric means as a function of surface variation.

9. Measuring means, comprising light variation contact means disposed in the path of a beam of light for contacting a surface to be checked, movement of said light variation contact means normal to said surface being a function of the variations of said surface, whereby said light is varied as a function of said surface, polarizing means disposed in the path of said light after said light impinges upon said light variation contact means and comprising two differently polarized portions, rotatable polarizing means, said rotatable polarizing means and said polarizing means being disposed in partial optical alignment with one another, whereby rotation of said rotatable polarizing means allows light to pass through both said polarizing means and said rotatable polarizing means when similarly polarized portions are in alignment, and photoelectric means disposed in alignment with both of said polarizing means for receiving light passing through both, whereby the variation of light impinging upon said photoelectric means is a function of said surface variations.

References Cited by the Examiner

UNITED STATES PATENTS

| | | | |
|---|---|---|---|
| 1,794,341 | 2/1931 | Parkhurst | 33—125 |
| 1,963,310 | 6/1934 | Nichols | 33—125 |
| 2,048,154 | 7/1936 | Abbott et al. | 33—174 X |
| 2,864,280 | 12/1958 | Keller et al. | 33—46.2 X |
| 3,012,469 | 12/1961 | Clayborne | 88—14 |

FOREIGN PATENTS

| | | |
|---|---|---|
| 632,760 | 12/1961 | Canada. |
| 565,881 | 12/1944 | Great Britain. |

ISAAC LISANN, *Primary Examiner.*